Patented Nov. 9, 1926.

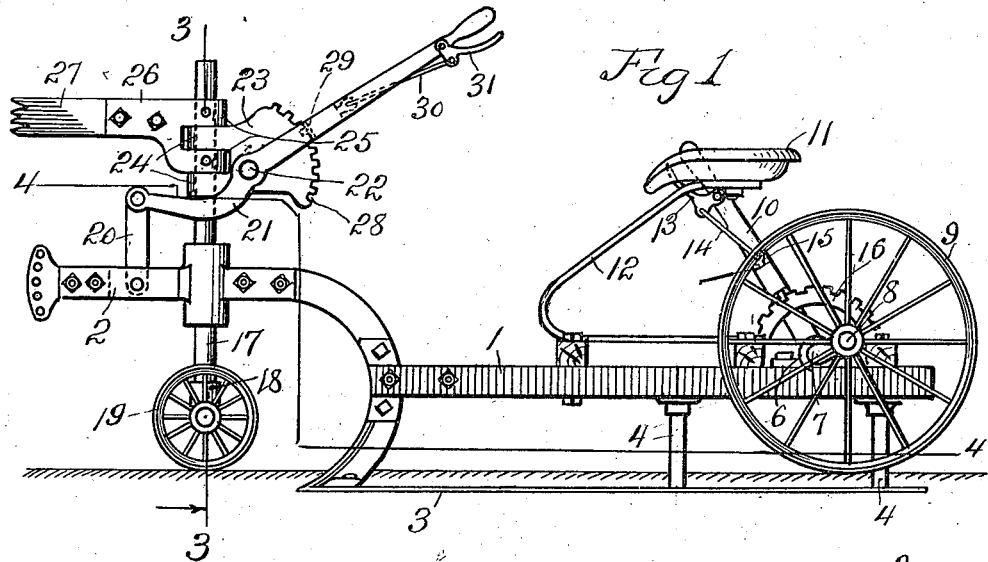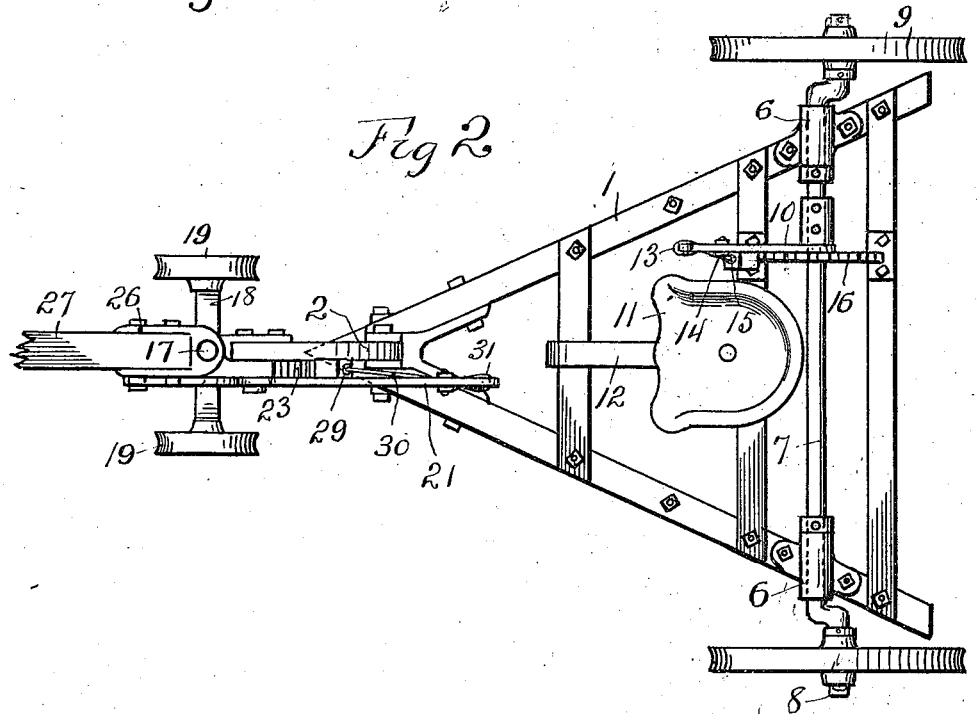

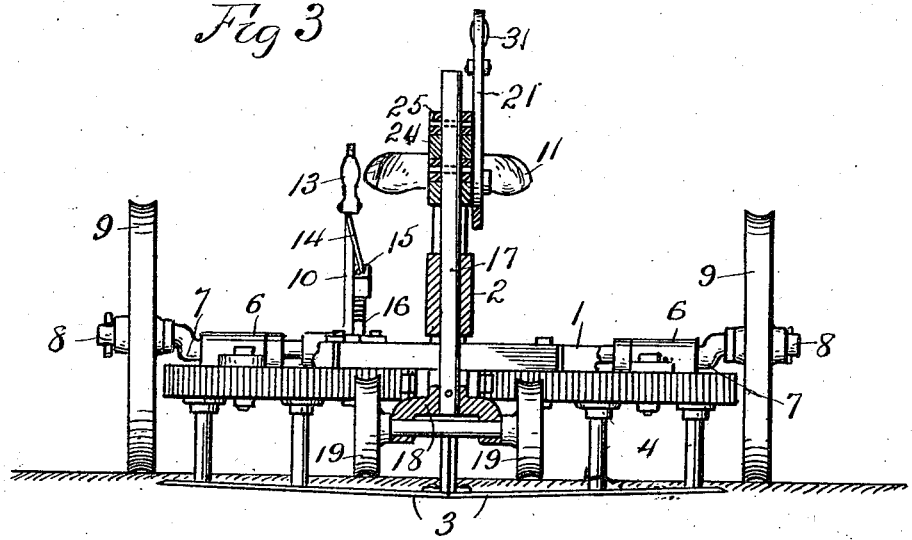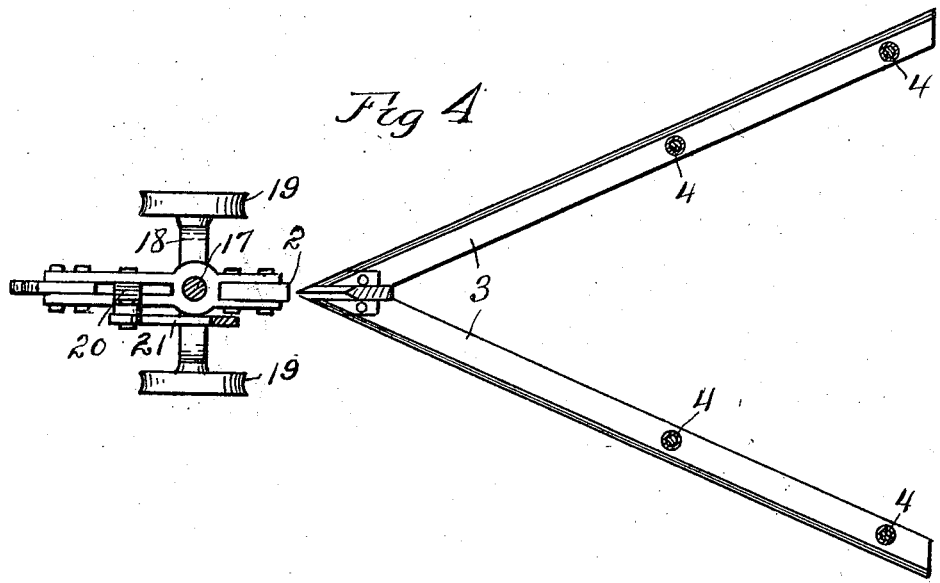

1,606,122

UNITED STATES PATENT OFFICE.

ANTON HERL AND LOUIS A. HAUSER, OF HAYS, KANSAS, ASSIGNORS OF ONE-THIRD TO CARL A. ENGEL, OF HAYS, KANSAS.

WEEDING MACHINE.

Application filed July 18, 1923. Serial No. 652,338.

Our invention relates to improvements in weeding machines.

One of the objects of our invention is to provide a machine which has large capacity, which will do efficient work, which is simple, strong, durable, and not liable to get out of order, and which may be quickly and easily adjusted to clear the ground or to cut at different distances below the surface of the ground.

The novel features of our invention are hereinafter fully described and claimed.

In the accompanying drawing, which illustrates the preferred embodiment of our invention, Fig. 1 is a side elevation of our improved weeding machine shown in the weed cutting position.

Fig. 2 is a top view of the same.

Fig. 3 is a vertical sectional view on the line 3—3 of Fig. 1.

Fig. 4 is a sectional view on the line 4—4 of Fig. 1.

Similar reference characters designate similar parts in the different views.

The frame of the machine has a triangular body 1 disposed horizontally and provided at its forward end with a draft beam 2 having a downwardly extending curved rear portion to the lower end of which are securely fastened the forward ends of two substantially horizontal flat cutting blades 3, which are joined, preferably, at their front ends and which diverge rearwardly and are securely fastened at their upper flat sides to the lower ends of vertical members 4, the upper ends of which are fastened to the under side of the body 1.

The outer longitudinal edges of the blades 3 are cutting edges.

For supporting the rear portion of the frame, it has secured to its upper side bearings 6, in which is pivotally mounted the arch 7 of an arched axle 8, on the ends of which are respectively mounted two rear carrying wheels 9 adapted to travel on the ground. For turning the axle 8 to raise and lower the frame, the arch 7 has secured to it a lever 10, the upper end of which is adjacent to an operator's seat 11, which is carried on a spring bar 12, supported on the body 1. Pivoted to the lever 10 is a bell crank lever 13, with which is connected a rod 14, which is fastened to a sliding bolt 15, mounted on the lever 10 and adapted to enter notches in the periphery of an arcuate plate 16, which is mounted on the body 1, see Fig. 1.

By swinging the lever 10 backwardly and forwardly, the rear end of the frame can be raised and lowered, and then held by the bolt 15 in the position to which it is adjusted.

The draft beam 2 has slidably mounted in it a vertical standard 17, having at its lower end attached thereto a cross bar 18, on the ends of which are respectively rotatably mounted two small carrying wheels 19 adapted for travel on the ground. Attached to the beam 2 forward of the standard 17 is a link 20, which has its lower end pivoted to the beam 2 and which has its upper end pivoted to the forward end of a lever 21, which is fulcrumed on a transverse bolt 22 mounted on a plate 23 which has two forwardly extending arms 24, one of which is mounted between two rearwardly extending arms 25 of a plate 26 which is rigidly secured to the rear end of a tongue 27.

The rear edge of the plate 23 is provided with an arcuate row of notches 28 adapted to receive a sliding bolt 29, Figs. 1 and 2, which has secured to it one end of a rod 30, the other end of which is fastened to a bell crank lever 31 pivoted to the lever 21. By operating the lever 31, so as to withdraw the bolt 29, from the notches 28, the lever 21 may be swung downwardly and upwardly to raise and lower the forward end of the frame.

The levers 10 and 21 may be adjusted, so that the blades 3 will clear the ground or may travel through the ground at any desired distance from the surface thereof, within the range of adjustment, and also to be tilted downwardly and forwardly, instead of traveling horizontally, if desired.

In the operation of our invention, a team of horses or a tractor may be attached to the draft beam 2 in the usual manner. The levers 21 and 10 are then adjusted, so that when the machine is traveling forwardly, the blades 3, in the weed cutting operation, will travel through the ground and will cut the weeds off below the surface of the ground.

Our invention is particularly well adapted for exterminating wild morning glory vines. The ground being cultivated for this purpose, several times during a season.

The blades 3 being disposed substantially horizontally and with their flat sides up, offer but little resistance in passing through the ground, so that the machine can be easily drawn by a span of horses.

We do not limit our invention to the structure shown and described, as many modifications, within the scope of the appended claims, may be made without departing from the spirit of our invention.

What we claim is:—

1. In a weed cutting machine of the kind described, a wheeled support having a vertical standard, a frame vertically slidable on said standard, a tongue having two rearwardly extending arms rigidly attached to said standard, a toothed plate having two arms through which said standard extends, one arm of said toothed plate being disposed between the first named arms, a lever pivoted to said plate and having means for lockingly engaging the teeth of said plate, and a link pivoted to said lever and to said frame.

2. In a weed cutting machine of the kind described, a wheeled support having a vertical standard, a frame slidable on said standard, a tongue having two arms through which said standard extends and which are rigidly fastened to said standard, a plate having two arms through which said standard extends, one of the latter arms being between the first named arms, a lever pivoted to said plate and having means for releasably locking therewith, and a link pivoted to said lever and to said frame.

In testimony whereof we have signed our names to this specification.

ANTON HERL.
LOUIS A. HAUSER.